United States Patent
Bontempo et al.

(10) Patent No.: US 6,487,059 B2
(45) Date of Patent: Nov. 26, 2002

(54) SWITCHING MODE POWER SUPPLY DEVICE WITH DETECTION OF MALFUNCTIONING

(75) Inventors: Gregorio Bontempo, Barcellona Pozzo di Gotto (IT); Claudio Adragna, Monza (IT); Mauro Fagnani, Nerviano (IT); Albino Pidutti, Udine (IT); Francesco Pulvirenti, Acireale (IT); Roberto Quaglino, Biella (IT); Giuseppe Gattavari, Busto Arsizio (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 0 days.

(21) Appl. No.: 09/919,343

(22) Filed: Jul. 30, 2001

(65) Prior Publication Data

US 2002/0044463 A1 Apr. 18, 2002

(30) Foreign Application Priority Data

Jul. 31, 2000 (EP) ............................. 00830547

(51) Int. Cl.[7] ................................ H02H 3/20
(52) U.S. Cl. ................ 361/90; 363/56.11; 363/21.07
(58) Field of Search ................ 363/56.11, 56.12, 363/21.07; 361/90, 94, 91.4

(56) References Cited

U.S. PATENT DOCUMENTS

| | | | | |
|---|---|---|---|---|
| 5,675,485 A | * | 10/1997 | Seong ..................... | 363/21.15 |
| 5,862,044 A | * | 1/1999 | Shioya et al. ............ | 363/21.07 |
| 5,978,195 A | * | 11/1999 | Goder et al. .................. | 361/94 |
| 6,023,178 A | * | 2/2000 | Shioya et al. ............... | 327/176 |
| 6,088,244 A | * | 7/2000 | Shioya et al. ............... | 323/902 |

* cited by examiner

Primary Examiner—Shawn Riley
(74) Attorney, Agent, or Firm—Lisa K. Jorgenson; Harold H. Bennett, II; Seed IP Law Group PLLC

(57) ABSTRACT

The power supply device includes a DC-DC converter circuit having a power switch and a driving stage. The driving stage has a compensation terminal on which a compensation voltage is present, and which receives a biasing current. The driving stage includes a control circuit having an output terminal connected to a control terminal of the power switch and disconnection-detecting circuitry connected to the compensation terminal and generating a signal for permanent turning-off of the power switch when the biasing current drops below a current-threshold value. The driving stage moreover includes over-voltage detecting circuitry connected to the compensation terminal and generating a signal for temporary turning-off of the power switch when the compensation voltage exceeds a voltage-threshold value.

12 Claims, 3 Drawing Sheets

SWITCHING MODE POWER SUPPLY DEVICE WITH DETECTION OF MALFUNCTIONING

BACKGROUND OF THE INVENTION

1. Technical Field

The present invention regards a power supply device with detection of malfunctioning.

2. Description of the Related Art

As is known, electronic power supplies are extensively used in appliances for offices, in data-acquisition systems, and in the so-called "silver boxes" for supplying motherboards, memory devices, interface circuits, etc., present inside computers.

An example of a power supply device of the off-line type is schematically illustrated in FIG. 1. The power supply device 1 has an input terminal 2 receiving an input voltage VIN, and an output terminal 3 connected to a load 4 and supplying an output voltage VOUT. The input voltage VIN is a mains AC voltage (220 V, 50 Hz), and the output voltage VOUT is a DC voltage.

The power supply device 1 comprises the following: a first rectifier circuit 5 (of the diode-bridge type) connected between the input terminal 2 and a first terminal of a first filter capacitor 7, the latter having a second terminal connected to a ground terminal; and a DC-DC-converter circuit 8, of the forward type, connected between the first terminal of the first filter capacitor 7 and the output terminal 3.

The DC-DC converter circuit 8 comprises a transformer 9 made up of a primary winding 9a and a secondary winding 9b. The primary winding 9a has a first terminal connected to the first terminal of the first filter capacitor 7, and a second terminal connected to a first conduction terminal of a power switch 10, which has a second conduction terminal connected to the ground terminal, and a control terminal 11. The secondary winding 9b has a first terminal connected to the output terminal 3 by means of a second rectifier circuit 13, and a second terminal connected to the ground terminal. The power switch 10 is a discrete-type power transistor sized for power outputs higher than 200 W. Alternatively, the power switch 10 may be a high voltage integrated power transistor sized for power outputs of the order of tens of Watts.

The second rectifier circuit 13 includes the following: a first diode 16 having its anode connected to the first terminal of the secondary winding 9b, and its cathode connected to a connection node 17; a second diode 18 having its cathode connected to the connection node 17, and its anode connected to the ground terminal; an induction coil 19 connected between the connection node 17 and the output terminal 3; and a second filter capacitor 20 connected between the output terminal 3 and the ground terminal.

The DC-DC converter circuit 8 further comprises a driving stage 12 made up of a pulse-width modulation (PWM) controller circuit integrated using, for example, BCD off-line technology. The driving stage 12 has a compensation terminal 34 connected to a compensation node 30, and an output terminal connected to the control terminal 11 of the power switch 10. The driving stage 12 comprises a current generator 31 having an output terminal connected to the compensation terminal 34 and supplying a biasing current $I_P$. The compensation node 30 is also connected to a first terminal of a compensation capacitor 32 having a second terminal connected to the ground terminal.

The DC-DC converter circuit 8 also comprises a voltage divider 14 and a regulating circuit 15. The voltage divider 14 is connected between the output terminal 3 and the ground terminal, and is made up of a first resistor 21 and a second resistor 22 connected together at a feedback node 23, on which a feedback voltage $V_{FB}$ is present that is proportional to the output voltage $V_{OUT}$. The regulating circuit 15 is connected between the feedback node 23 and the compensation node 30, and includes an error amplifier 24 having an inverting input terminal connected to the feedback node 23, a non-inverting input terminal connected to a voltage generator 25 supplying a reference voltage $V_{REF}$, and an output terminal 26 supplying an error voltage $V_E$ correlated to the difference between the feedback voltage $V_{FB}$ and the reference voltage $V_{REF}$. The regulating circuit 15 moreover includes a photocoupler 27 comprising the following: a photodiode 28 having its anode connected to the output terminal 3 of the power supply device 1, and its cathode connected to the output terminal 26 of the error amplifier 24; and a phototransistor 29 having a first conduction terminal connected to the compensation node 30, a second conduction terminal connected to the ground terminal, and a control terminal receiving light radiation emitted from the photodiode 28.

Operation of the power supply device 1 is described in what follows.

The input voltage $V_{IN}$ is rectified by means of the first rectifier circuit 5 and filtered by means of the first filter capacitor 7 to obtain a continuous voltage $V_{DC}$. The continuous voltage $V_{DC}$ is applied across the primary winding 9a when the power switch 10 is on. The driving stage 12 causes the power switch 10 to switch at a fixed frequency, normally over 20 kHz (threshold of acoustic audibility) and with a duty-cycle δ that depends upon the value of a compensation voltage $V_{COMP}$ present on the compensation node 30 and due to the charging of the compensation capacitor 32 by the current generator 31; namely:

$$\delta = \frac{T_{ON}}{T_{ON} + T_{OFF}} = f(V_{COMP}) \qquad (1)$$

where $T_{ON}$ designates the time interval during which the power switch 10 is on, and $T_{OFF}$ designates the time interval during which the power switch 10 is off.

The energy associated to the input voltage $V_{IN}$ is transferred to the secondary winding 9b of the transformer 9 (which has also the task of insulating the circuitry connected downstream of the power supply device 1 from the high voltage). The second rectifier circuit 13 supplies, on the output terminal 3, the output voltage $V_{OUT}$, which for a forward-type DC-DC converter in continuous mode is $$V_{OUT} = \frac{T_{ON}}{T_{ON} + T_{OFF}} V_{DC} \qquad (2)$$

The regulating circuit 15 performs continuous regulation and stabilization of the output voltage $V_{OUT}$, rendering it immune from the variations of the input voltage $V_{IN}$ and of the load 4. In greater detail, initially, when the phototransistor 29 is off, the current generator 31 charges the compensation capacitor 32, causing the compensation voltage $V_{COMP}$ to increase. As soon as the phototransistor 29 turns on, it absorbs the biasing current $I_P$ and fixes the compensation voltage $V_{COMP}$, adapting it automatically to the conditions of the power supply device 1. In this way, the duty-cycle δ of the power switch 10 is fixed, and likewise the output voltage $V_{OUT}$.

It is known that current standards require, for reasons of safety, that in off-line power supply devices there should be a physical separation (galvanic decoupling) between the circuits supplied by AC voltage and the circuits supplied by low voltage. The minimum distance required is 8 mm. For this reason, DC-DC converters are of the forward type or, alternatively, of the flyback type, in that both these configurations use transformers for transferring energy, and decoupler components (photocouplers and signal transformers) for making the regulating circuit. At present, photocouplers, on account of their low cost, are the components most extensively used for making regulating circuits.

A problem linked to the presence of photocouplers is that, if for any reason, the regulating circuit breaks or gets disconnected, the compensation voltage increases beyond a certain operating limit. In such conditions, the duty-cycle of the controlled transistor reaches its maximum value, as likewise does the energy that the transformer transfers to the load, with consequent increase in the output voltage $V_{OUT}$.

To prevent the output voltage $V_{OUT}$ from reaching values such as might damage the circuitry connected downstream of the power supply device, the latter is modified as shown in FIG. 2, in which parts that are the same as those already illustrated with reference to FIG. 1 are designated by the same reference numbers. In particular, the power supply device 1 of FIG. 2 comprises an alarm circuit 40 connected in parallel to the regulating circuit 15. The alarm circuit 40 includes an alarm amplifier 41 having an inverting input terminal connected to the feedback node 23, a non inverting input terminal connected to a voltage generator 42 that supplies a threshold voltage $V_{OV}$ (also referred to as "overvoltage"), and an output terminal 43 supplying an alarm voltage $V_A$ correlated to the difference between the feedback voltage $V_{FB}$ and the threshold voltage $V_{OV}$. The alarm circuit 40 further includes an alarm photocoupler 44 comprising an alarm photodiode 45 which has its anode connected to the output terminal 3 of the power supply device 1 and its cathode connected to the output terminal 43 of the alarm amplifier 41, and an alarm phototransistor 46 having a first conduction terminal connected to the compensation node 30, a second conduction terminal connected to the ground terminal, and a control terminal receiving light radiation emitted by the alarm photodiode 45. In addition, the driving stage 12 has an alarm terminal 48 and comprises a current generator 47 having an output terminal connected to the alarm terminal 48 and supplying an alarm current $I_A$.

In these conditions, when the regulating circuit 15 breaks or gets disconnected and the output voltage $V_{OUT}$ exceeds the threshold voltage $V_{OV}$, the alarm circuit 40 intervenes, bringing about permanent turning-off of the DC-DC converter circuit 8.

The power supply device of FIG. 2 presents, however, the drawback of having a high circuit complexity and somewhat high production prices.

SUMMARY OF THE INVENTION

According to one embodiment of the invention, a power supply device is provided. The power supply device comprises a DC-DC converter circuit including a power switch and a driving stage. The driving stage has a compensation terminal on which a compensation voltage is present and which receives a biasing current, the driving stage comprising a control circuit having an output terminal connected to a control terminal of the power switch and disconnection-detecting means connected to the compensation terminal and generating a signal for permanent turning-off of said power switch when the biasing current drops below a current-threshold value. The driving stage moreover comprises over-voltage detecting means connected to the compensation terminal and generating a signal for temporary turning-off of said power switch when said compensation voltage exceeds a voltage-threshold value.

According to another embodiment of the invention, a method of operation of the device is provided.

BRIEF DESCRIPTION OF THE DRAWINGS

The characteristics and advantages of the power supply device according to the invention will emerge from the ensuing description of an example of embodiment, which is provided to furnish a non-limiting illustration, with reference to the attached drawings, in which.

DETAILED DESCRIPTION OF THE INVENTION

Figure 1:
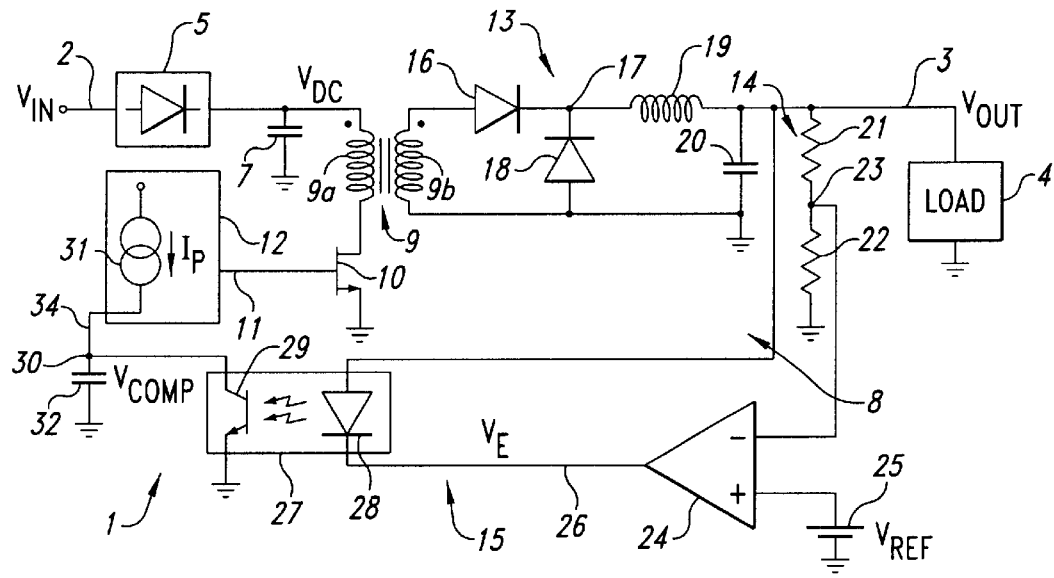
FIG. 1 shows a first circuit diagram of a known power supply device.
Figure 2:
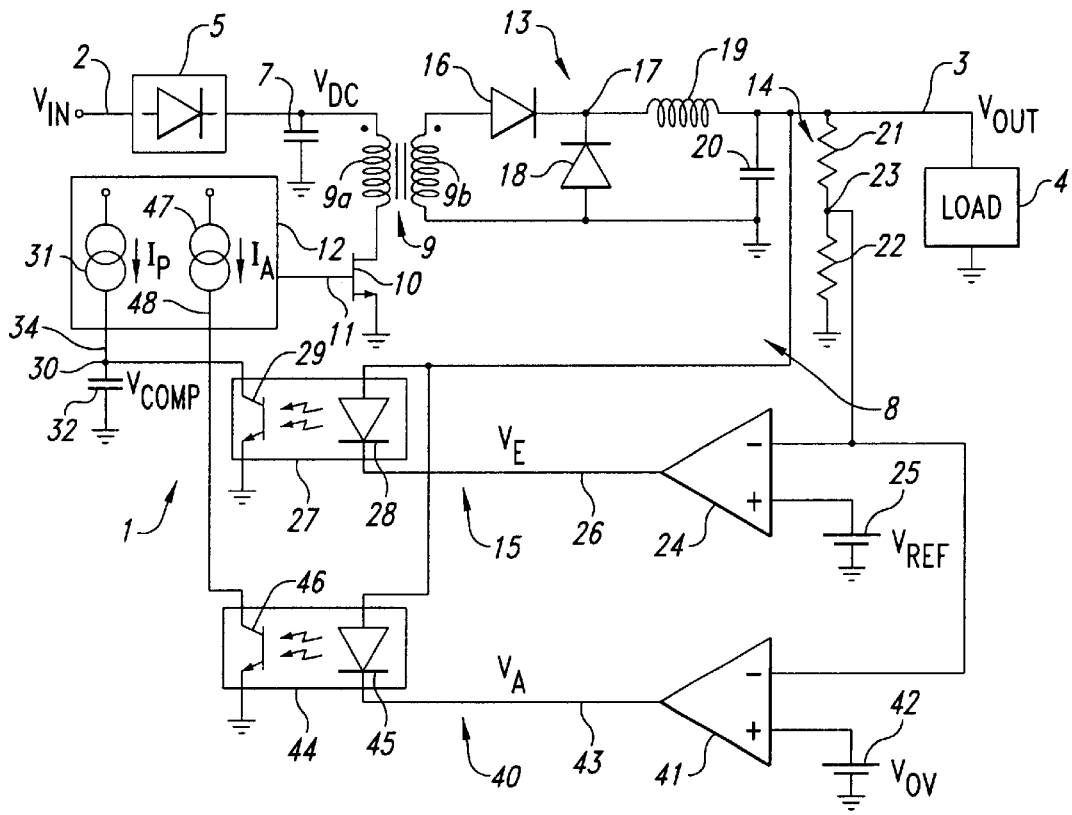
FIG. 2 shows a second circuit diagram of a known power supply device.
Figure 3:
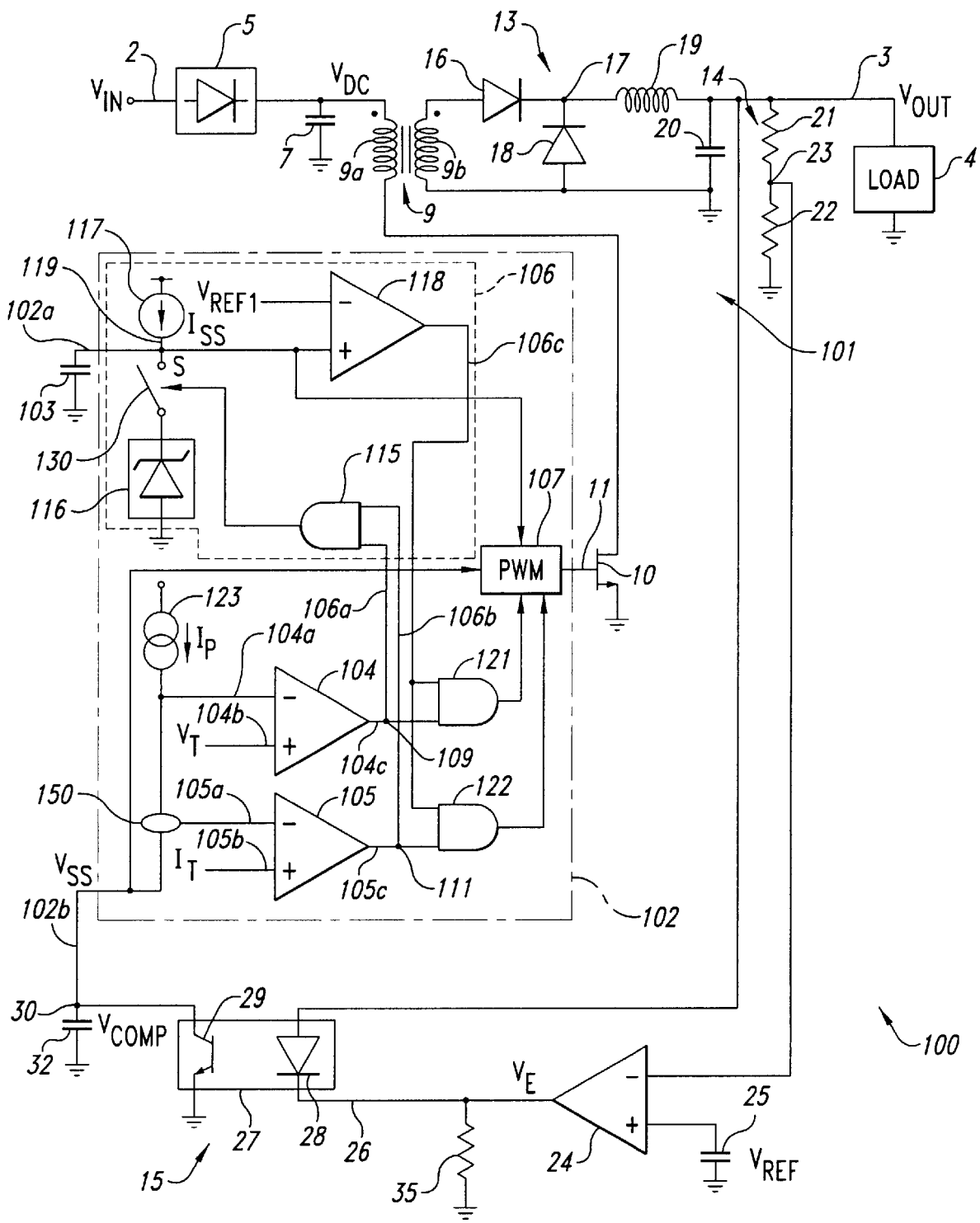
FIG. 3 shows a circuit diagram of a power supply device according to the invention.

FIG. 3, in which parts that are the same as those already illustrated with reference to FIG. 1 are designated by the same reference numbers, shows an off-line power supply device 100 comprising a forward-type DC-DC converter 101. The invention is not, however, limited to the use of this type of DC-DC converter, but may be employed with DC-DC converters having different circuit configurations, such as those of the boost type, flyback type, etc., using integrated technologies that are not necessarily of the off-line type.

The DC-DC converter 101 comprises a driving stage 102 connected between a soft-start terminal 102a, on which a soft-start voltage $V_{SS}$ is present, a compensation terminal 102b connected to the compensation node 30, and the control terminal 11 of the power switch 10. The soft-start terminal 102a is connected to the first terminal of a soft-start capacitor 103 which has a second terminal connected to the ground terminal. The driving stage 102 includes a first threshold comparator 104, a second threshold comparator 105, and a soft-start circuit 106. In greater detail, the first threshold comparator 104 has a detection terminal 104a connected to the compensation terminal 102b, a reference terminal 104b receiving a threshold voltage $V_T$, and an output terminal 104c connected to a first circuit node 109. The second threshold comparator 105 has a detection terminal 105a connected to the compensation terminal 102b via a voltage/current transducer 150, a reference terminal 105b receiving a threshold current $I_T$, and an output terminal 105c connected to a second circuit node 111. The voltage/current transducer 150 monitors the value of the biasing current $I_P$. The soft-start circuit 106 is connected to the soft-start terminal 102a and has a first activation terminal 106a connected to the first circuit node 109, a second activation terminal 106b connected to the second circuit node 111, and an output terminal 106c. The soft-start circuit 106 comprises the following: a first logic gate 115, of the OR type, having a first input terminal connected to the first activation terminal 106a, a second input terminal connected to the second activation terminal 106b, and an output terminal generating an opening signal S; a voltage limiting circuit 116, formed, for example, by means of a Zener diode, having a first terminal connected to the ground terminal and a second terminal connected to the soft-start terminal 102a by means of a switch 130 driven by the opening signal S. The soft-start circuit 106 further comprises a first current generator 117 connected to a supply line 120 and having an output terminal 119 that supplies a constant current $I_{SS}$ to the soft-start terminal 102a, and a voltage comparator 118 that has a non inverting input terminal connected to the soft-start terminal 102a, an inverting input terminal receiving a reference voltage $V_{REF1}$, and an output terminal.

A soft-start circuit is always present in power supply devices. As will be better described later, it prevents, upon turning-on of the power supply device 100, the output voltage $V_{OUT}$ from being subjected to dangerous overvoltages and prevents any damage occurring to the power switch 10 owing to the excessive current required by the power supply device during turning-on.

The driving stage 102 further comprises: a second logic gate 121, of the AND type, having a first input terminal and a second input terminal that are respectively connected to the output terminal 106c of the soft-start circuit 106 and to the first circuit node 109, and an output terminal; a third logic gate 122, of the AND type, having a first input terminal and a second input terminal respectively connected to the output terminal of the soft-start circuit 106 and to the second circuit node 111, and an output terminal. The driving stage 102 also comprises: a control circuit 107, made by means of a PWM comparator, having a first input terminal connected to the compensation terminal 102b, a second input terminal connected to the output terminal of the second logic gate 121, a third input terminal connected to the output terminal of the third logic gate 122, a fourth input terminal connected to the soft-start terminal 102a, and an output terminal connected to the control terminal 11 of the power switch 10; a second current generator 123 having an output terminal that supplies the biasing current $I_P$ to the compensation terminal 102b.

Figure 4:
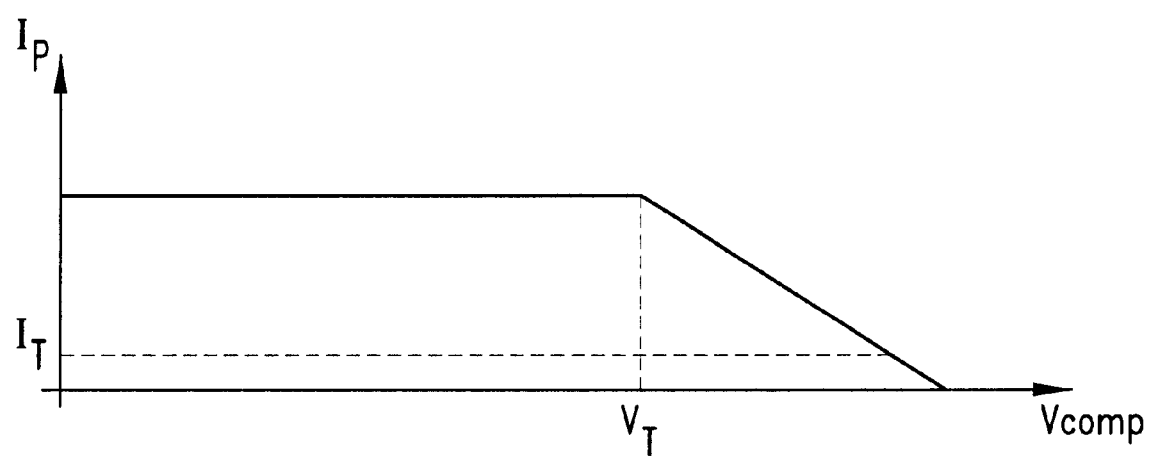
FIG. 4 shows the plot of an electrical quantity sampled on the power supply device of FIG. 3.

As shown in FIG. 4, the biasing current $I_P$ has a constant plot throughout the range of variation of the compensation voltage $V_{COMP}$ and decreases until it reaches a value of 0 $\mu$A when the compensation voltage $V_{COMP}$ exceeds the threshold voltage $V_T$.

In addition, the power supply device 100 comprises a resistive element 35 connected between the cathode of the photodiode 28 and the ground terminal. The resistive element 35 guarantees that in any operating condition (except in the loop-disconnection condition), current will flow in the photodiode 28.

Consequently, in any operating condition (except in the loop-disconnection condition), in the phototransistor 29 a collector current is present that is higher than the threshold current $I_T$ (FIG. 4).

The invention envisages monitoring of the values of the compensation voltage $V_{COMP}$ and of the biasing current $I_P$, controlling turning-off of the power supply device 100 temporarily when the compensation voltage $V_{COMP}$ exceeds the value of the threshold voltage $V_T$ (overload condition), and controlling turning-off of the power supply device 100 permanently when the biasing current $I_P$ drops below the value of the threshold current $I_T$ (loop-disconnection condition). In fact, the overload condition is almost always transient; for this reason, the power supply device 100 may be turned off temporarily (remaining free to turn on and off again) until the overload condition terminates. This operating mode of the power supply device 100 is called "bounce mode". Instead, the loop-disconnection condition may be removed only by an operator. In this latter case, then, the power supply device 100 must be turned off permanently until the operator cuts off the supply voltage (i.e., the input voltage $V_{IN}$). This operating mode of the power supply device 100 is called "latch mode".

In detail, the power supply device 100 operates as described below.

Upon turning-on of the power supply device 100, the switch 130 is closed, and the first current generator 117 starts charging the soft-start capacitor 103 with the constant current $I_{SS}$. In this phase, the duty-cycle of the power switch 10 depends upon the value of the soft-start voltage $V_{SS}$. In particular, the soft-start voltage $V_{SS}$ increases linearly until it reaches the first threshold $V_{SS1}$ (for example, 3 V). Once this first threshold $V_{SS1}$ has been reached, the voltage-limiting circuit 116 blocks charging of the soft-start capacitor 103. At this point, control of the duty-cycle of the power switch 10 passes on to the regulating circuit 15. In this way, overvoltages in the output voltage $V_{OUT}$ are prevented. In fact, in the absence of the soft-start circuit 106, the compensation voltage $V_{COMP}$ would immediately reach its maximum value, thus determining the maximum duty-cycle possible and inducing the power switch 10 to carry the maximum current.

Under normal operating conditions, the phototransistor 29 absorbs the entire biasing current $I_P$, and the compensation voltage $V_{COMP}$ is fixed by the regulating circuit 15, but at the same time can vary within a well defined voltage range (operating range, known in the literature concerning power supply devices), in which the maximum value and minimum value are respectively referred to as "ramp peak" and "ramp valley". Typically, this operating range is from 1 V to 3 V, but may assume any other value.

In the case where an overload occurs on the output terminal 3 of the power supply device 100, the current in the photodiode 28 decreases, remaining, however, above the value of the threshold current $I_T$ (whereby the second threshold comparator 105 does not switch). Consequently, the compensation voltage $V_{COMP}$ increases above the threshold voltage $V_T$, thus causing switching of the first threshold comparator 104, which generates a signal for temporary turning-off of the power supply device 100. Switching of the first threshold comparator 104 causes opening of the switch 130, by means of the control signal S generated by the first logic gate 115. In these conditions, the soft-start capacitor 103 restarts charging (by means of the first current generator 117) until it reaches a second threshold, higher than the first threshold (for instance, 5 V), beyond which the voltage comparator 118 switches. The output of the second logic gate 121 thus goes to a high logic level, so controlling temporary turning-off (bounce mode) of the power supply device 100, via the control circuit 107. The soft-start circuit 106 performs a masking of the first threshold comparator 104, thus generating a given delay time ("masking time") in the turning-off of the power supply device 100, so as to prevent it from going into action when it should not.

In the case where a loop disconnection occurs in the regulating circuit 15, the current required by the photocoupler 27 becomes zero. As soon as the biasing current $I_P$ drops below the value of the threshold current $I_T$ (FIG. 4), the second threshold comparator 105 switches, thus generating a signal for permanent turning-off of the power supply device 100. When one of the two threshold comparators 104, 105 turns off, in a way similar to what has been described previously, the soft-start circuit 106 unblocks and delays turning-off of the power supply device 100. Subsequently, switching of the voltage comparator 118 causes the output of the third logic gate 122 to go to a high logic level, thus controlling permanent turning-off (latch mode) of the power supply device 100, via the control circuit 107.

The advantages that may be obtained with the power supply device described herein are illustrated in what follows. In the first place, the power supply device according to the invention is simpler from the circuitry standpoint, and hence less costly to build, than known power supply devices, in so far as it does not require the use of a dedicated alarm circuit and a dedicated alarm terminal. Furthermore, the power supply device according to the invention may be either of the linear type or of the switching type.

Finally, it is clear that numerous variations and modifications may be made to the power supply device described and illustrated herein, all of which fall within the scope of the inventive idea as defined in the attached claims.

From the foregoing it will be appreciated that, although specific embodiments of the invention have been described herein for purposes of illustration, various modifications may be made without deviating from the spirit and scope of the invention. Accordingly, the invention is not limited except as by the appended claims.

What is claimed is:

1. A power supply device having an input terminal and an output terminal between which is connected a DC-DC converter circuit, said DC-DC converter circuit comprising:
    an isolation transformer having primary and secondary windings, isolating an input portion of the DC-DC converter circuit from an output portion of the DC-DC converter;
    a power switch having a first output terminal and a control terminal; and
    a driving stage having a compensation terminal on which a compensation voltage is present and receiving a biasing current wherein the compensation voltage varies inversely relative to a voltage level at the output terminal and the biasing current varies directly relative to the voltage level at the output terminal, said driving stage including a control circuit having a first input terminal connected to said compensation terminal and an output terminal connected to said control terminal of said power switch;
    said driving stage further including disconnection-detecting means connected to said compensation terminal and generating a signal for permanent turning-off of said power switch when said biasing current drops below a current threshold value;
    said driving stage also including over-voltage detecting means connected to said compensation terminal and generating a signal for temporary turning-off of said power switch when said compensation voltage exceeds a voltage-threshold value.

2. The device according to claim 1, wherein said over-voltage detecting means comprise first comparator means having a detecting terminal connected to said compensation terminal and an output terminal connected to a second input terminal of said control circuit and supplying said signal for temporary turning-off, and said disconnection-detecting means comprise second comparator means having a detecting terminal connected to said compensation terminal and an output terminal connected to a third input terminal of said control circuit and supplying said signal for permanent turning-off.

3. The device according to claim 2, wherein said driving stage comprises a soft-start circuit connected to a soft-start terminal on which a soft-start voltage is present, said soft-start circuit having a first activation terminal and a second activation terminal respectively connected to said output terminals of said first and second comparator means, and an output terminal connected to said second and third input terminals of said control circuit, said soft-start circuit being activated by at least one of said signals for temporary and permanent turning-off, and supplying, on said output terminal, a control signal for delaying turning-off of said power switch.

4. The device according to claim 3, wherein said soft-start voltage increases and presents a rise time from a first reference value to a second reference value, and said control signal has a duration correlated to said rise time of said soft-start voltage.

5. The device according to claim 3, wherein said soft-start circuit comprises:
    a first logic gate having a first input terminal and a second input terminal connected, respectively, to said first activation terminal and said second activation terminal of said soft-start circuit, and an output terminal generating an opening signal S;
    a voltage limiting circuit having a first terminal connected to said soft-start terminal by means of a switch element controlled by said opening signal S, and a second terminal connected to a ground terminal;
    a current generator having an output terminal connected to said soft-start terminal; and
    a voltage comparator having a first input terminal connected to said soft-start terminal, a second input terminal receiving said second reference value, and an output terminal connected to said first output terminal of said soft-start circuit.

6. The device according to claim 3, wherein said driving stage comprises:
    a second logic gate having a first input terminal connected to said output terminal of said soft-start circuit, a second input terminal connected to said first comparator means, and an output terminal connected to said second input terminal of said control circuit; and
    a third logic gate having a first input terminal connected to said output terminal of said soft-start circuit, a second input terminal connected to said output terminal of said second comparator means, and an output terminal connected to said third input terminal of said control circuit.

7. The device according to claim 6, wherein said first logic gate is of the OR type and said second and third logic gates are of the AND type.

8. The device according to claim 1, wherein said control circuit is a comparator of the PWM type.

9. A device comprising:
    a power control switch that operates at a variable duty cycle, having a control terminal and configured to provide power to a load;
    a regulator circuit, configured to monitor a current drawn by the load and provide a compensation voltage level at a compensation node, proportionate to the current draw;
    a driver circuit having an input connected to the compensation node and an output connected to the control terminal of the power switch, configured to monitor the compensation voltage at the compensation node and adjust the duty cycle of the power switch to compensate for the current draw; and
    an overload detection circuit coupled to the control terminal of the power switch and configured to temporarily hold the power control switch open in the event that the compensation voltage exceeds a first threshold voltage, and to latch the power control switch open in the event that the compensation a second threshold voltage.

10. The device of claim 9, wherein:

the device is a power supply device, the device includes an isolation transformer;

the power switch regulates current flow in a primary winding of the isolation transformer; and the load draws current from a secondary winding of the isolation transformer.

11. A method comprising:

comparing a voltage level at an output terminal of a power supply device with a first reference voltage;

providing a compensation voltage at a compensation node, proportionate to the result of the comparing step;

varying a duty cycle of a power control switch with reference to the compensation voltage of the providing step, wherein the power control switch provides current to the output terminal of the power supply device;

comparing the compensation voltage to a second reference voltage;

opening the power control switch if the compensation voltage exceeds the second reference voltage, wherein the opening results in temporarily turning off the power supply device;

comparing a biasing current at the compensation node with a current reference; and latching the power control switch open if the biasing current at the compensation node drops below the current reference, wherein the latching results in permanently turning off the power supply device.

12. The method of claim 11, wherein the power supply device includes an isolation transformer;

the power control switch regulates current flow in a primary winding of the isolation transformer; and a load draws current from a secondary winding of the isolation transformer.

* * * * *

UNITED STATES PATENT AND TRADEMARK OFFICE
CERTIFICATE OF CORRECTION

PATENT NO.        : 6,487,059 B2                                     Page 1 of 1
APPLICATION NO.   : 09/919343
DATED             : November 26, 2002
INVENTOR(S)       : Gregorio Bontempo et al.

It is certified that error appears in the above-identified patent and that said Letters Patent is hereby corrected as shown below:

Column 9, line 4, after "compensation" insert --voltage exceeds--

Signed and Sealed this

Twenty-second Day of September, 2009

David J. Kappos
*Director of the United States Patent and Trademark Office*